(12) United States Patent
Suzuki (10) Patent No.: US 7,321,216 B2
(45) Date of Patent: Jan. 22, 2008

(54) MOTOR CONTROL APPARATUS AND VEHICLE STEERING APPARATUS USING THE SAME

(75) Inventor: Hiroshi Suzuki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 10/582,088

(22) PCT Filed: Nov. 17, 2004

(86) PCT No.: PCT/JP2004/017075

§ 371 (c)(1),
(2), (4) Date: Jun. 8, 2006

(87) PCT Pub. No.: WO2005/057774

PCT Pub. Date: Jun. 23, 2005

(65) Prior Publication Data

US 2007/0126392 A1    Jun. 7, 2007

(30) Foreign Application Priority Data

Dec. 10, 2003   (JP)   ............................. 2003-411757

(51) Int. Cl.
*H02P 6/08* (2006.01)

(52) U.S. Cl. ...................... 318/609; 318/254; 318/661; 388/906; 180/443

(58) Field of Classification Search ................ 318/138, 318/254, 439, 720–724, 609, 610, 661; 388/906; 180/6.28, 443
See application file for complete search history.

(56) References Cited

U.S. PATENT DOCUMENTS 6,583,593 B2 *  6/2003  Iijima et al. ................. 318/254
6,683,774 B2 *  1/2004  Kameya et al. ............. 361/139
6,838,844 B2 *  1/2005  Shimizu et al. ............. 318/287
6,885,927 B2 *  4/2005  Arimura ....................... 701/41

FOREIGN PATENT DOCUMENTS

| JP | 11-341897 | 12/1999 |
|---|---|---|
| JP | 2000-23499 | 1/2000 |
| JP | 2003-231476 | 8/2003 |

\* cited by examiner

*Primary Examiner*—Bentsu Ro
(74) *Attorney, Agent, or Firm*—Oblon, Spivak, McClelland, Maier & Neustadt, P.C.

(57) ABSTRACT

This invention provides a motor control apparatus and vehicle steering apparatus capable of determining whether the motor control CPU is normal or abnormal with an inexpensive structure. A monitor circuit 70 of an ECU 50 outputs a trigger signal trg based on an excitation signal of a motor resolver 42 from a trigger output circuit 71; samples and holds U-phase actual current value Iu, V-phase actual current value Iv and cos phase signal outputted from the motor resolver 42 with S/H circuit 72 based on the trigger signal trg; acquires q-axis current instruction value Iq* through wiring 80; and determines whether the CPU 60 is normal or abnormal based on consistency or inconsistency of polarity signs introduced from the relation among the cos phase signal, q-axis current instruction value Iq*, U-phase actual current value Iu and V-phase actual current value Iv based on a predetermined expression with an operational circuit 73, sign determining circuits 74, 75, 76, multiplying circuit 77 and sign comparing circuit 78 and outputs "1" as determination information if it is normal and "−1" if it is abnormal.

5 Claims, 8 Drawing Sheets

MOTOR CONTROL APPARATUS AND VEHICLE STEERING APPARATUS USING THE SAME

CROSS-REFERENCE TO RELATED APPLICATION

The present application claims priority under 35 U.S.C. §119 to Japanese Patent Application No. JP2003-411757. The content of the application is incorporated herein by reference.

TECHNICAL FIELD

The present invention relates to a motor control apparatus for vector-controlling a DC brushless motor with a motor control CPU based on a motor rotation angle detected by 1-phase excitation 2-phase output type resolver and a vehicle steering apparatus using the same.

BACKGROUND ART

Conventionally, to monitor whether or not the direction of current flowing actually to a motor (hereinafter referred to as actual torque current) is right with respect to torque instruction current value (q-axis current instruction value) in DC brushless motor vector control, for example, "motor control apparatus" disclosed in Patent Document 1 mentioned below has been known. This "motor control apparatus" includes a torque direction monitoring portion for monitoring the direction of output torque of the motor by comparing a torque current detection value sent from a feedback converting portion with a torque instruction value computed by the torque instruction value computing portion of a motor control CPU with reference to a predetermined map in the vehicle control CPU which is other CPU than the motor control CPU. As a result, the output in an opposite direction of the motor due to computing error within the motor control CPU and an abnormal output of the motor can be determined simply.

[Patent Document 1] JP 2000-23499 A (page 2-page 4, FIGS. 1, 2)

DISCLOSURE OF THE INVENTION

[Problem to be Solved by the Invention]

However, in the "motor control apparatus" disclosed in the above-mentioned Patent Document 1, an actual torque current is obtained independently with the vehicle control CPU which is other outside CPU than the motor control CPU so as to compare it with torque instruction current. Further, a map is referred to in order to compare the both. Thus, this vehicle control CPU has such a problem that a through-put to computing processing of the entire vehicle control CPU is deteriorated because increase of processing load accompanied by independent computation of the actual torque current cannot be avoided. Although this problem can be solved by using a CPU having a high performance and securing a more rapid computation velocity, the high performance CPU is generally expensive thereby leading directly to increase of product cost.

Figure 8:
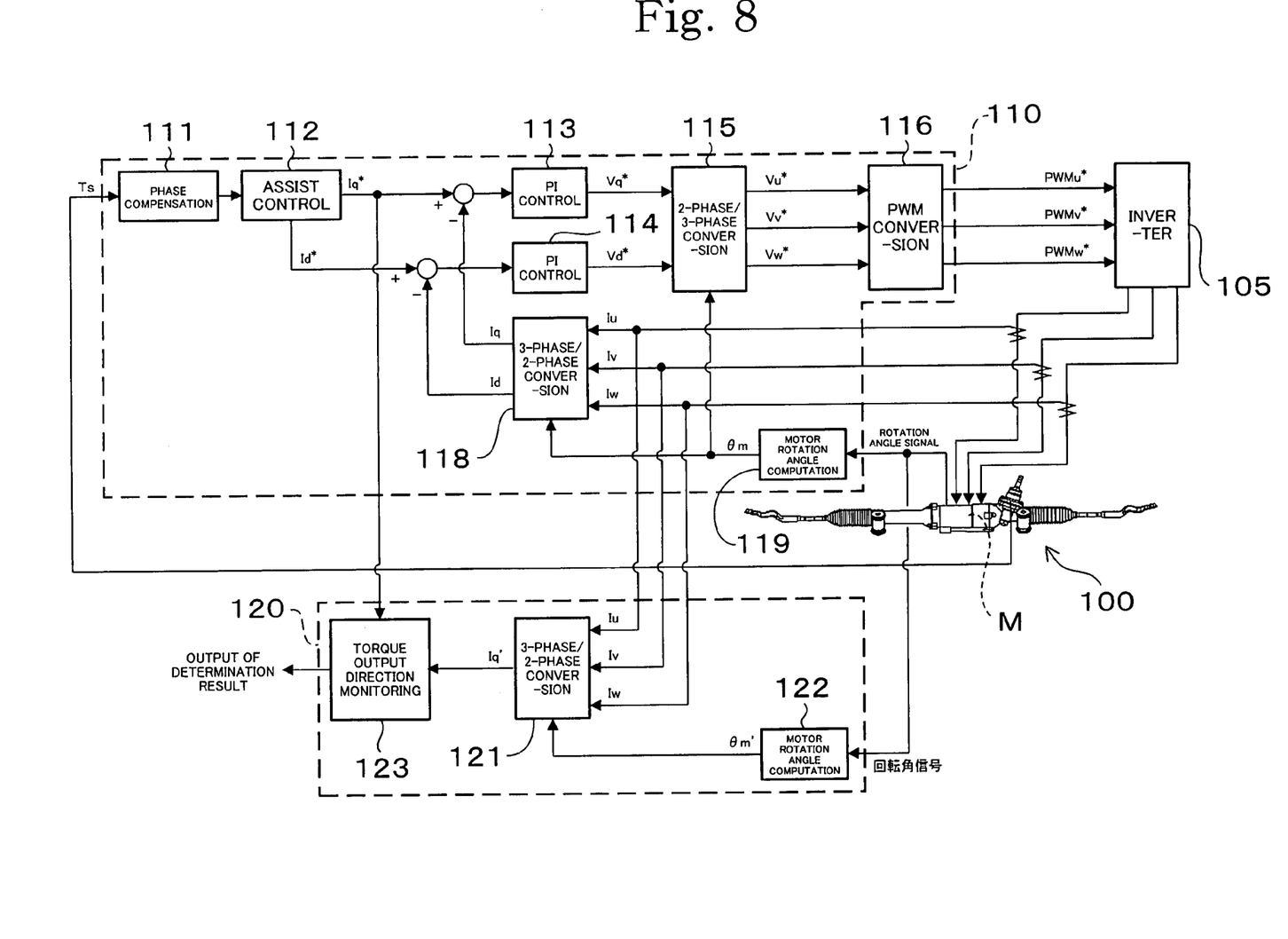
FIG. 8 is a functional block showing the functional block diagram of the PI control system of a motor and monitor system of a motor control CPU of a conventional example.

A motor control apparatus for PI controlling an assist motor M incorporated in a steering mechanism 100 of an electric power steering apparatus shown in FIG. 8 includes a motor control CPU 110 capable of executing phase compensation processing 111, assist control processing 112, PI control processings 113, 114, 2-phase/3-phase converting processing 115, PWM converting processing 116, 3-phase/2-phase converting processing 118, motor rotation angle operation processing 119 and the like. Such motor control CPU 110 obtains d-axis actual current value Id and q-axis actual current value Iq by converting 3-phase actual current values Iu, Iv, Iw composed of phase U, phase V, phase W outputted from an inverter 105 for driving the assist motor M through 3-phase/2-phase converting processing 118 and feeds back a difference between the d-axis, q-axis actual current values Id, Iq and the d-axis, q-axis current instruction values Id*, Iq* outputted from assist control processing 112 to PI control loop. As a consequence, voltage instruction values Vd*, Vq* for the feedback controlled d-axis, q-axis are outputted from the PI control processings 113, 114 and thus, by converting this to 3-phase voltage instruction values Vu*, Vv*, Vw* through 2-phase/3-phase converting processing 115 and then outputting PWM signals PWMu*, PWMv*, PWMw* to the inverter 105 through PWM converting processing 116, the PWM control of the assist motor M is enabled.

If the structure of monitoring with other outside CPU than the motor control CPU 110 is adopted like the aforementioned "motor control apparatus" to monitor whether or not the direction of actual torque current to the q-axis current instruction value Iq by the motor control CPU 110 is right, for example, it is necessary to provide a monitor CPU 120 capable of executing 3-phase/2-phase converting processing 121, motor rotation angle operation processing 122, torque output direction monitoring processing 123 and the like. That is, the monitor CPU 120 obtains the q-axis actual current value Iq' from the 3-phase actual current values Iu, Iv, Iw flowing through the assist motor M through the 3-phase/2-phase converting processing 121 as the d-axis, q-axis actual current values Id, Iq are obtained by the motor control CPU 110 and then, monitors and determines whether the direction of the output torque of the assist motor M is normal or abnormal by referring to a predetermined map or the like from this q-axis actual current value Iq' and the q-axis current instruction value Iq* obtained in the CPU 110.

If the example of a structure of the motor control apparatus of an assist motor M shown in FIG. 8 is compared with the structure of the aforementioned "motor control apparatus" disclosed in the Patent Document 1, the assist control processing 112 shown in FIG. 8 corresponds to the torque instruction value computing portion (18) and current value computing portion (22) of the "motor control apparatus" of the Patent Document 1 (hereinafter, numerals in the parentheses correspond to reference numerals described in the Patent Document). Hereinafter, the PI control processings 113, 114, the 2-phase/3-phase converting processing 115 and PWM converting processing 116 correspond to the comparing adjusting portion (28) of the "motor control apparatus" of the Patent Document 1. The 3-phase/2-phase converting processings 118, 121 correspond to the feedback converting portion (34) of the "motor control apparatus" and the torque output direction monitor processing 123 correspond to the torque direction monitor portion (42) of the "motor control apparatus" in the Patent Document 1.

If the above-described conventional structure is adopted as shown in FIG. 8, peripheral circuits, control programs and the like are necessary when the monitor CPU 120 is added newly because this monitor CPU 120 is provided separately from the motor control CPU 110. This complicates the structure and control of both hardware and software and leads to increase of product cost, which is a problem to be solved. Further, even if the role of the monitor CPU 120 is borne by existing other CPU, reduction of throughput of operation processing and rise in product cost can be induced as described above, which is another problem to be solved.

The present invention has been achieved to solve the above-described problem and an object of the invention is to provide a motor control apparatus capable of determining whether the motor control CPU is normal or abnormal with an inexpensive structure. Another object of the present invention is to provide a motor control apparatus capable of determining whether the output of the DC brushless motor is appropriate with an inexpensive structure. Still another object of the invention is to provide a vehicle steering apparatus capable of preventing generation of drive force acting in an inappropriate direction.

[Means for Solving the Problem]

To achieve the above-described objects, the means described in claim 1 of the scope of claim for patent is adopted. According to this means, a trigger means, holding means, acquiring means and determining means are constructed of a logic circuit functionally independent of a motor control CPU and a trigger signal is outputted based on an excitation signal of a resolver from the trigger means and then, based on this trigger signal, at least 2-phase current signals of 3-phase current signals composed of phase U, phase V, phase W for driving the DC brushless motor and cos phase signal outputted from the resolver are held with the holding means. Then, the q-axis current instruction value of the d-axis, q-axis current instruction values to be converted to 3-phase current signals is acquired with the acquiring means and whether the motor control CPU is normal or abnormal is determined based on consistency or inconsistency of polarity signs introduced from the relation based on a predetermined expression among the cos phase signal, q-axis current instruction value and 2-phase current signals by the determining means while its determination result is outputted as determination information. As a consequence, whether the motor control CPU is normal or abnormal can be determined based on the determination information outputted from the determining means without providing other outside CPU than the motor control CPU.

"Functionally independent of the motor control CPU" means that the logic circuit can exerts its own function properly and independently with the functioning state of the motor control CPU not affected even if the control program of the motor control CPU runs away so that the motor control CPU gets into a uncontrollable condition (this is the same in CLAIMS).

The predetermined expression is expressed as sign (Iu/2+Iv)=sign (Iq*×cos θ) if cos phase signal, the q-axis current instruction value, actual current value of the U-phase current signal and actual current value of the V-phase current signal are assumed to be cos θ, Iq*, Iu and Iv respectively, for example, when the 2-phase current signals is U-phase current signal and V-phase current signal. Sign( ) is a function which obtains positive/negative polarity sign as a result of operation in the parentheses (same hereinafter). In this case, if the expression is established, it is determined that the motor control CPU is normal and otherwise, it is determined that it is abnormal. Further, if the 2-phase current signals is U-phase current signal and W-phase current signal, it is expressed as sign (Iu/2+Iw)≠sign (Iq*×cos θ) or sign (Iu/2+Iw)=sign (−Iq*×cos θ) when the cos phase signal, q-axis current instruction value, the actual current value of U-phase current signal and the actual current value of W-phase current signal are assumed to be cos θ, Iq*, Iu and Iw respectively. In this case, if the expression is established, it is determined that the motor control CPU is normal and otherwise, it is determined that it is abnormal.

Because the determination information is outputted when the d-axis current instruction value of the d-axis, q-axis current instruction values is substantially zero or zero by adopting the means described in claim 2 in CLAIMS, whether the motor control CPU is normal or abnormal can be determined accurately according to the determination information outputted from the determining means without being influenced by the d-axis current instruction value even if the magnetic filed weakening control for lowering induced electromotive force is carried out by feeding current for killing out magnetic force by a permanent magnet of a rotator to the coil of a stator of a DC brushless motor.

Because by adopting the means described in claim 3 in the scope of claim for paten, the trigger means outputs the trigger signal when the excitation signal is sin(ωt)=1 or sin(ωt)=−1, the trigger signal can be outputted at a timing in which the amplitude of the excitation signal becomes maximum. Thus, the amplitude of the cos phase signal held by the holding means can be maximized so that determining of whether the polarity signs are consistent or inconsistent with the determining mean can be carried out.

Because by adopting the means described in claim 4 in CLAIMS, the 2-phase current signals is "U-phase current signal and V-phase current signal" or "U-phase current signal and W-phase current signal" of the 3-phase current signals, it can be constituted preferably for detecting any 1-phase current signals of phase V and phase W around the U-phase current signal. In the meantime, the 2-phase current signals may be "U-phase current signal and V-phase current signal" or "V-phase current signal and W-phase current signal" of the 3-phase current signals. As a consequence, it can be constructed preferably for detecting any 1-phase current signals of the phase U and phase W around the V-phase current signal.

By adopting the means described in claim 5 in CLAIMS, the drive control of the assist motor by the motor control CPU is stopped if the determination information indicating that the motor control CPU is abnormal is outputted by the determining means. As a consequence, the assist control of the driven wheels can be prevented when the output of the assist motor is inappropriate.

[Effect of the Invention]

According to the invention of claim 1, the trigger means, the holding means, the acquiring means and the determining means are constructed of a logic circuit functionally independent of the motor control CPU without providing other outside CPU than the motor control CPU and whether the motor control CPU is normal or abnormal can be determined according to the determination information outputted from the determining means. Therefore, comparing in a case where another outside CPU is utilized, normal or abnormal can be judged with an inexpensive construction. Thus, whether the output of the DC brushless motor is appropriate or inappropriate can be determined with an inexpensive structure.

According to the invention of claim 2, even in case of executing the "magnetic filed weakening control" for lowering induced electromotive force by feeding current for killing out magnetic force of a permanent magnet of the rotator to the coil of the stator of the DC brushless motor, whether the motor control CPU is normal or abnormal can be determined accurately according to the determination information outputted from the determining means without being influenced by this d-axis current instruction value.

Thus, even in case of executing the "magnetic field weakening control", whether the motor control CPU is normal or abnormal can be determined accurately with an inexpensive structure. As a consequence, whether the output of the DC brushless motor is appropriate or inappropriate can be determined with an inexpensive structure.

Because the invention of claim 3 enables the trigger signal to be outputted at a timing in which the amplitude of an excitation signal becomes maximum, the amplitude of the cos phase signal held by the holding means can be maximized so that determining of whether the polarity signs are consistent or inconsistent with the determining means can be carried out securely. Thus, whether the motor control CPU is normal or abnormal can be determined securely. Further, whether the output of the DC brushless motor is appropriate or inappropriate can be determined securely with an inexpensive structure.

Because the invention of claim 4 enables the system to be constructed preferably for detecting the U-phase current signal and any 1-phase current signal of the phase V and phase W, in addition to the above-described effect, whether the motor control CPU is normal or abnormal can be determined with an inexpensive structure even if there is such a limitation that for example, the phase W or phase V current signal cannot be used for the reason of the hardware structure. If the V-phase current signal and any 1-phase current signal of the phase U and phase W is detected, in addition to the above-described effect, such a limitation that the phase U or phase W current signal cannot be used for the reason of the hardware structure can be met.

Because according to the invention of claim 5, the drive control of the assist motor by the motor control CPU is stopped if the determination information indicating that the motor control CPU is abnormal is outputted by the determining means, for example, the assist control of the driven wheels when the output of the assist motor is in appropriate can be prevented. Thus, generation of the drive force acting in an inappropriate direction can be prevented.

BRIEF DESCRIPTION OF THE DRAWINGS

FIG. 5(A) is an explanatory diagram showing an example in which a timing when the excitation signal of a motor resolver turns to sin(ωt)=1 is expressed with ● (black circle) while a timing when the same excitation signal turns to sin(ωt)=−1 is expressed with ○ (white circle), FIG. 5 (B) is an explanatory diagram showing an example in which cos phase signal of the motor resolver is sampled at the timing of ● (black circle) shown in FIG. 5(A), FIG. 5(C) is an explanatory diagram showing an example in which sin phase signal of the motor resolver is sampled at the timing of ● (black circle) shown in FIG. 5(A), FIG. 5(D) is an explanatory diagram showing an example of cos phase signal waveform (solid line) and sin phase signal waveform (dotted line) after sampling and holding.

FIG. 6(A) shows a case where the q-axis current instruction value Iq* is larger than 0 (zero) and FIG. 6(B) shows a case where the q-axis current instruction value Iq* is smaller than 0 (zero).

FIG. 7(A) shows a case where the q-axis current instruction value Iq* is larger than 0 (zero) and FIG. 7(B) shows a case where the q-axis current instruction value Iq* is smaller than 0 (zero).

BEST MODE FOR CARRYING OUT THE INVENTION

Hereinafter, the embodiments of the automobile electric power steering apparatus using the motor control apparatus of the present invention will be described with reference to the accompanying drawings.

Figure 1:
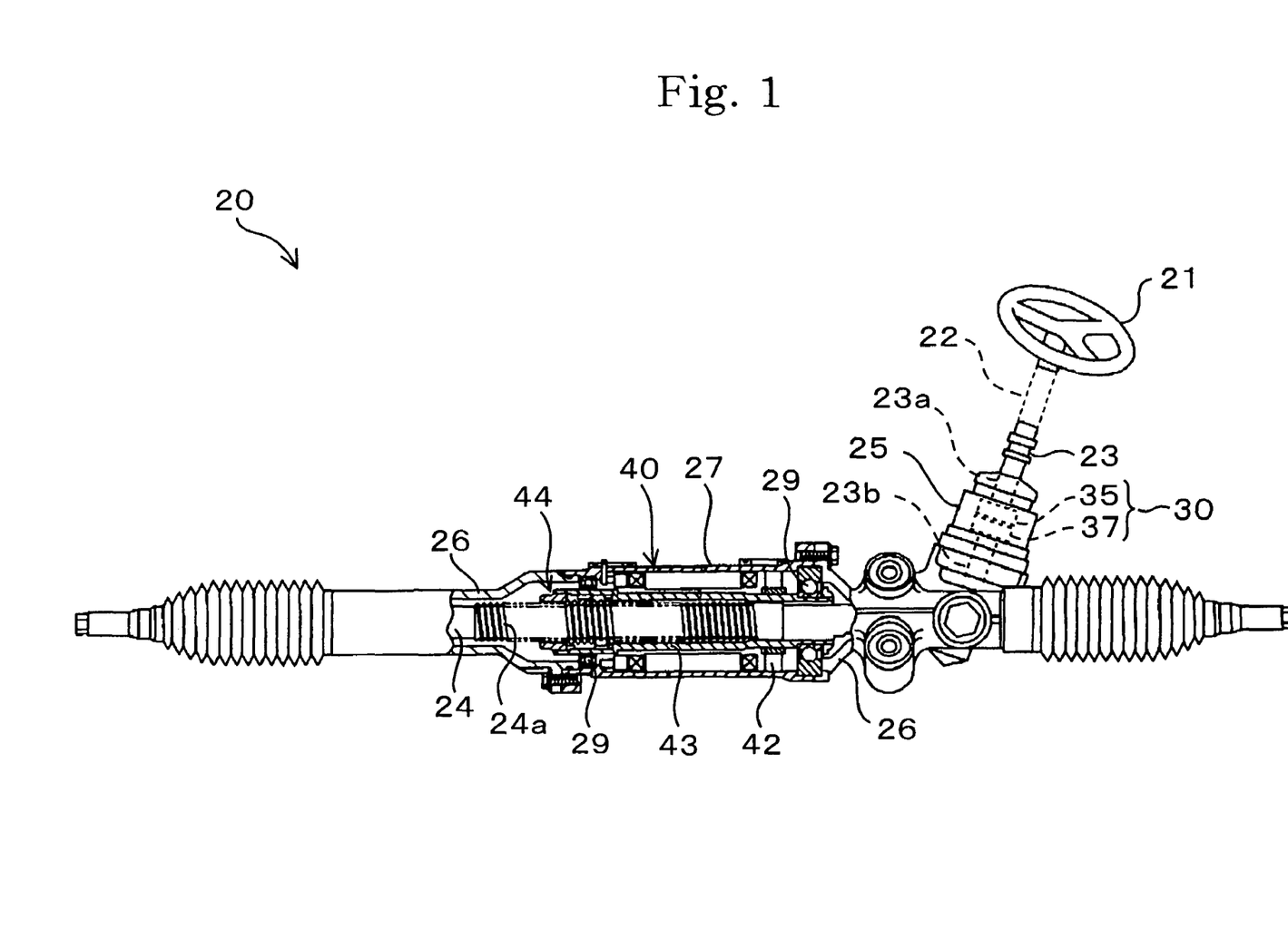
FIG. 1 is a structure diagram showing the structure of an electric power steering apparatus according to an embodiment of the present invention.
Figure 2:
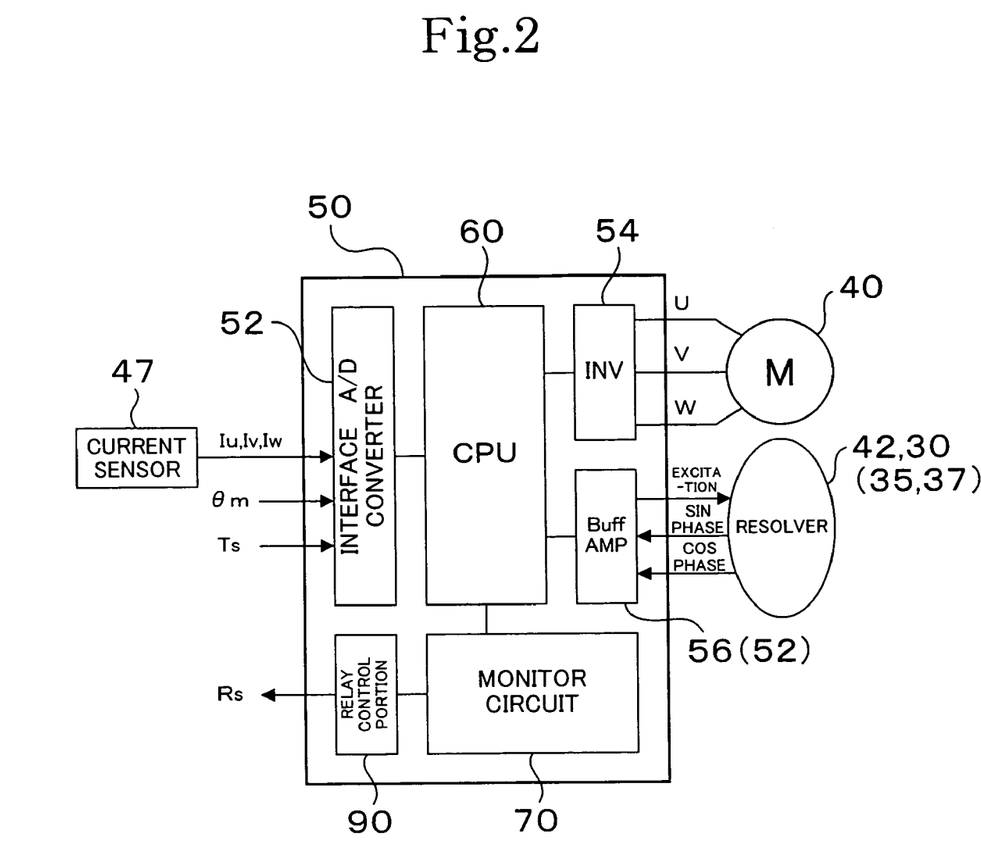
FIG. 2 is a block diagram showing the electric configuration of the ECU of the electric power steering apparatus.

As shown in FIGS. 1, 2, the electric power steering apparatus of this embodiment (hereinafter referred to as "electric power steering apparatus") comprises mainly a steering wheel 21, steering shaft 22, pinion shaft 23, rack shaft 24, torque sensor 30, assist motor 40, motor resolver 42, steering mechanism 20 provided with ball screw mechanism 44 and ECU (Electronic Control Unit) 50 as a motor control unit for drive-controlling the assist motor 40 of this steering mechanism 20. The electric power steering apparatus assists the steering by a driver by driving the assist motor 40 based on a steering condition detected by the torque sensor 30 and corresponds to "vehicle steering apparatus" described in CLAIMS. In the meantime, driven wheels (not shown) are connected to both sides of the rack shaft 24 through a tie-rod or the like.

As shown in FIG. 1, an end side of a steering shaft 22 is connected to the steering wheel 21 and an input shaft 23a and a torsion bar (not shown) of the torque sensor 30 incorporated in a pinion housing 25 are connected to the other end of the steering shaft 22. The output shaft 23b of the pinion shaft 23 is connected to the other end side of this torsion bar by spline-coupling. In the meantime, a pinion gear is formed in an end portion of the output shaft 23b of the pinion shaft 23.

The torque sensor 30 is comprised of a first resolver 35 interposed between the input shaft 23a and the pinion housing 25 and a second resolver 37 interposed between the output shaft 23b and the pinion housing 25. This torque sensor 30 has a function of detecting a steering condition (steering torque and angle of the steering wheel) by the steering wheel 21 and is connected electrically to an ECU 50 (see FIG. 2). As a result, as described later, the torque sensor 30 outputs a torque signal Ts corresponding to a torsion angle of the torsion bar obtained from an angle difference between a first angle of the steering wheel detected by the first resolver 35 and a second angle of the steering wheel detected by the second resolver 37, angle ratio and the like to the ECU 50.

The rack shaft 24 is accommodated in a rack housing 26 and a motor housing 27 and includes a rack groove (not shown) capable of engaging with the pinion gear of the pinion shaft 23. As a consequence, rack and pinion mechanism is constituted with the pinion shaft 23. Further, a ball screw groove 24*a* is formed spirally in the intermediate portion of the rack shaft 24.

The assist motor 40 is an electric motor comprised of a cylindrical motor shaft 43 supported by bearings 29 such that it is rotatable coaxially with the rack shaft 24, a permanent magnet (not shown) provided on the outer periphery of the motor shaft 43, a stator (not shown), an excitation coil and the like and corresponds to the "DC brushless motor" described in CLAIMS.

That is, the assist motor 40 is so constructed that the motor shaft 43 can be rotated when magnetic field generated by excitation coils of 3-phases (U-phase, V-phase, W-phase) wound around a stator acts on the permanent magnet of the motor shaft 43 corresponding to a rotator. A voltage sensor (not shown) capable of detecting a voltage applied to this excitation coil and a current sensor 47 capable of detecting current (U-phase actual current value Iu, V-phase actual current value Iv, W-phase actual current value Iw) flowing in the excitation coil are provided on the assist motor 40 or the ECU 50 for each of the U-phase, V-phase and W-phase.

The motor resolver 42 is provided between the motor housing 27 accommodating the assist motor 40 and the motor shaft 43 and has a function of detecting a rotation angle (hereinafter referred to as "motor rotation angle") θm of the motor shaft 43. This motor resolver 42 is connected electrically to the ECU 50 like the torque sensor 30 (see FIG. 2) and outputs a signal corresponding to the motor rotation angle θm. This motor resolver 42 corresponds to "1-phase excitation 2-phase output type resolver" described in CLAIMS as described later.

The ball screw mechanism 44 is provided between the rack shaft 24 and the motor shaft 43 and has a function of converting a rotation torque of normal/reverse rotation of the motor shaft 43 to a reciprocating forward motion in the axial direction of the rack shaft 24. As a consequence, this reciprocating motion can be used as assist force of reducing the steering force of the steering wheel 21 through the pinion shaft 23 constituting the rack and pinion mechanism together with the rack shaft 24.

By constructing the steering mechanism 20 in this way, the steering condition by the steering wheel 21 can be detected with the torque signal Ts outputted from the torque sensor 30 and further, the operating condition of the assist motor 40 can be detected with a signal of the motor rotation angle θm outputted from the motor resolver 42 and the 3-phase actual current values Iu, Iv, Iw outputted from the current sensor 47.

Next, the electrical configuration of the ECU 50 for controlling the drive of the assist motor 40 constituting the steering mechanism 20 will be described with reference to FIG. 2. As shown in FIG. 2, the ECU 50 comprises mainly an interface 52, inverter 54, I/O buffer 56, CPU 60, monitor circuit 70, relay control portion 90 and the like. The interface 52, the inverter 54 and the I/O buffer 56 are connected to the CPU 60 through I/O bus.

The CPU 60 is comprised of, for example, microcomputer, semiconductor memory device (ROM, RAM, EEPROM and the like) and has a function of executing the basic motor control of the electric power steering apparatus described above according to a predetermined computer program. That is, the CPU 60 vector-controls the assist motor 40 based on the motor rotation angle θm detected by the motor resolver 42. In the meantime, the CPU 60 corresponds to the "motor control CPU" described in CLAIMS.

The interface 52 has a function of inputting a variety of sensor signals inputted from the torque sensor 30, the motor resolver 42 or the current sensor 47 into a predetermined port of the CPU 60 through an A/D converter or the like and outputting a resolver excitation signal outputted form the CPU 60 to the motor resolver 42 or the torque sensor (first resolver 35, second resolver 37) through the A/D converter or the like. Although FIG. 2 indicates that resolver excitation signal outputted from the CPU 60 to the resolver and sin phase signal and cos phase signal inputted from the resolver to the CPU 60 are inputted/outputted through the I/O buffer 56 for convenience, this I/O buffer 56 is included in the concept of the interface 52.

The inverter 54 has a function of converting electricity supplied from a DC power source Batt through a relay RL to controllable 3-phase AC power (see FIG. 4) and comprises a PWM circuit, a switching circuit and the like. In the meantime, the relay RL is of make contact type in which its contact point becomes conductive when the power is turned ON and becomes non-conductive when the power is turned OFF and is controlled to ON/OFF by the relay control portion 90.

The relay control portion 90 comprises a relay control circuit 91 for controlling the drive of the relay RL, a relay control circuit for controlling the drive of other relay (not shown) and the like, and for example, the relay control circuit 91 controls the ON/OFF of the relay RL based on determination information inputted from the monitor circuit 70. Because according to this embodiment, as described later, determination information "1" indicating that the CPU 60 is normal is inputted from the monitor circuit 70 when the CPU 60 is normal, the relay control circuit 91 enables supply of electricity from the DC power source Batt to the inverter 54 by outputting a control signal Rs for maintaining the relay RL in ON state to the relay RL. On the other hand, because determination information "−1" indicating that the CPU 60 is abnormal is inputted from the monitor circuit 70 when the CPU 60 is abnormal, the relay control circuit 91 disables supply of electricity from the DC power source Batt to the inverter 54 by canceling output of the control signal Rs for maintaining the relay RL in ON state. The configuration of the monitor circuit 70 in detail is described below.

Figure 3:
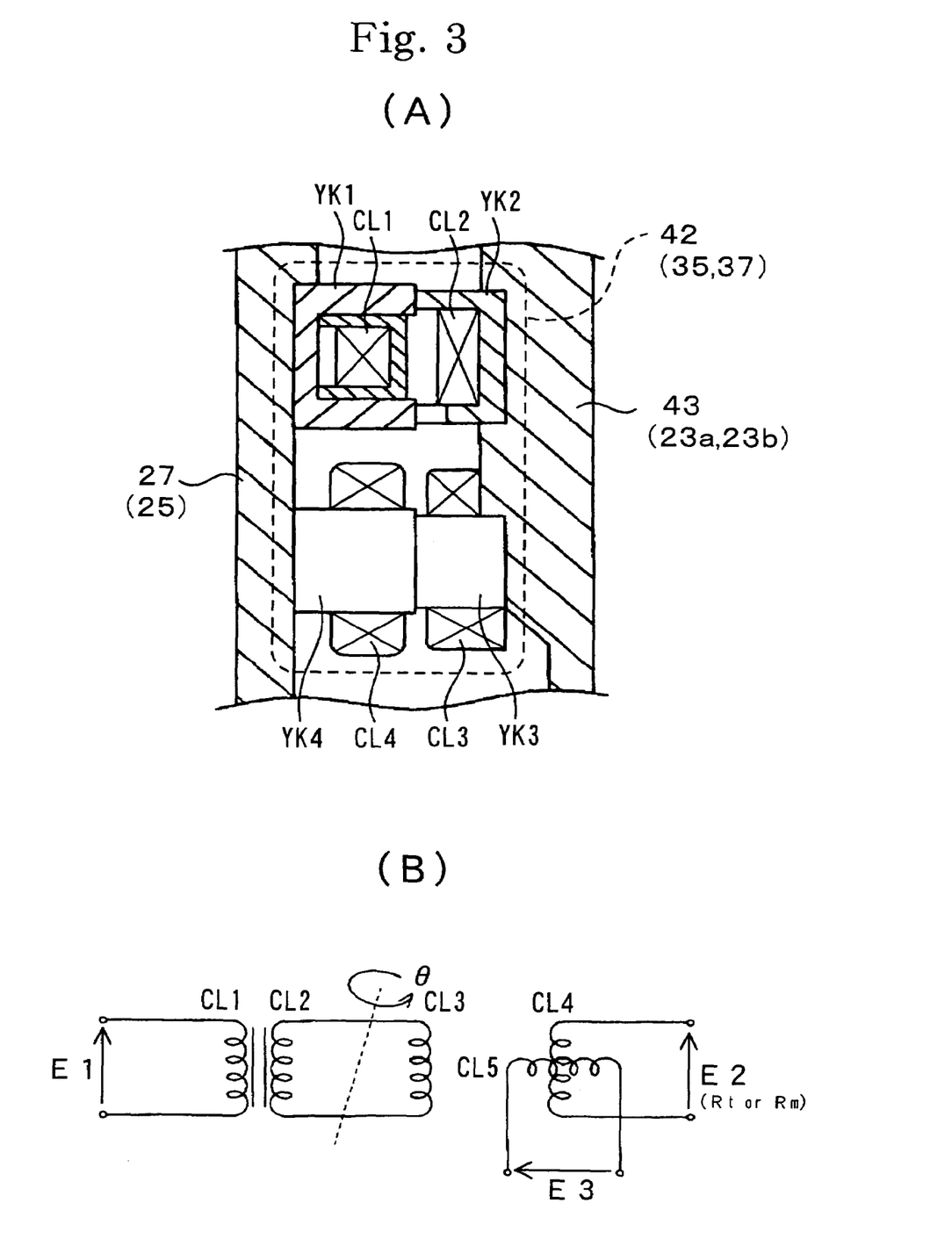
FIG. 3(A) is an explanatory diagram showing the structure of a resolver used in the electric power steering apparatus and FIG. 3(B) is a circuit diagram of the same resolver.

Here, the configuration of the motor resolver 42 will be described with reference to FIG. 3(A). In the meantime, because the first resolver 35 and the second resolver 37 constituting the torque sensor 30 has substantially the same configuration as the motor resolver 42, description thereof is omitted. As shown in FIG. 3(A), the motor resolver 42 is a resolver having seven counter electrodes (so-called 7X) which comprises a first yoke YK1, second yoke YK2, third yoke YK3, fourth yoke YK4, first coil CL1, second coil CL2, third coil CL3, fourth coil CL4 and fifth coil CL5.

The first yoke YK1 is formed circularly along the inner periphery of the motor housing 27 and fixed to the motor housing 27. The first coil CL1 is wound around the inner periphery of the first yoke YK1. On the other hand, the second yoke YK2 is formed circularly like the first yoke YK1 and fixed to the outer periphery of the motor shaft 43 such that it opposes the first yoke YK1 and the second coil CL2 is wound around it. As a consequence, the second yoke YK2 can rotate integrally with the motor shaft 43.

The third yoke YK3 is shifted in the axial direction of the motor shaft 43 with respect to the second yoke YK2, fixed to the outer periphery of the motor shaft 43 and can rotate integrally with the motor shaft 43. The third coil CL3 is wound around the third yoke YK3 and this third coil CL3 is connected electrically to the second coil CL2 of the second yoke YK2 in parallel. On the other hand, the fourth yoke YK4 is formed circularly along the inner periphery of the motor housing 27 like the first yoke YK1 and the fourth coil CL4 and the fifth coil CL5 are wound around and fixed to the motor housing 27. In the meantime, the fifth coil CL5 is wound around with its phase shifted by 90 degrees with respect to the fourth coil CL4.

Next, the electric characteristic of the motor resolver 42 will be described with reference to FIG. 3(B). In the meantime, because the first resolver 35 and the second resolver 37 have substantially the same electric characteristic as the motor resolver 42, description thereof is omitted.

As described above, the motor resolver 42 is a 1-phase excitation, 2-phase output (voltage detection) type resolver which is constituted of the first coil CL1-fifth coil CL5 while each of these coils has a connecting relation based on a circuit diagram shown in FIG. 3(B). Thus, resolver output signals E2, E3 corresponding to a detection angle θ (electric angle) can be obtained from the fourth coil CL4 and the fifth coil CL5, which are 2-phase output coils, by providing an excitation signal E1 outputted from the CPU 60 which constitutes the ECU 50 to the first coil CL1 and the second coil CL2 as a rotary transformer and further by providing to the third coil CL3 which is a 1-phase excitation coil. Because the resolver output signal outputted from the motor resolver 42 is an analog signal constituted of the sin phase signal and cos phase signal, it is inputted to the A/D converter incorporated in the CPU 60 through the I/O buffer 56 of the ECU 50 and converted to digital signal which can be processed by the CPU 60.

The electric angle θM obtained from the motor resolver 42 has seven peak points per a rotation (360 degrees) of the motor shaft 43. This reason is that as described above, the motor resolver 42 is a resolver having seven counter electrodes while it has seven pairs of N electrodes and S electrodes in electrical viewpoints and thus, it can output an electric angle corresponding to 360°×7=2520° to mechanical angle 360°. That is, the motor resolver 42 has a resolution seven times the resolver of 360° in electric angle.

Subsequently, a detection method for the motor rotation angle θm based on a resolver signal outputted from the motor resolver 42 will be described. First, if AC voltage E1 is applied to the first coil CL1 of the motor resolver 42 when the motor shaft 43 rotates at a certain rotation angle, magnetic flux is generated in the first yoke YK1 corresponding to applied voltage and its magnetic flux is transmitted to the second yoke YK2. Then, because the second coil CL2 is interlinked by this magnetic flux, AC voltage is induced so that AC voltage is generated in the third coil CL3 connected to the second coil CL2. Then, AC voltage is induced in the fourth coil CL4 and the fifth coil CL5 by AC voltage generated in this third coil CL3 and the AC voltages E2, E3 are outputted.

The applied AC voltages E1 and outputted AC voltages E2, E3 satisfy following expressions (1) and (2). In the meantime, in the expressions (1) and (2), K indicates ratio of transformation.

$$E2 = K \cdot E1 \times \cos\theta \quad (1)$$

$$E3 = K \cdot E1 \times \sin\theta \quad (2)$$

Thus, because the motor rotation angle θm can be computed based on the aforementioned expressions (1) and (2) by detecting the AC voltages E1, E2, E3 by means of the voltage sensor or the like, the motor rotation angle θm of the assist motor 40 can be detected according to its computation result. The motor rotation angle θm detected in this way is used for PI control by the ECU 50 as described below. The rotation angle of each of the first resolver 35 and the second resolver 37 constituting the torque sensor 30 can be obtained like the motor resolver 42. Thus, the steering torque Ts by the steering wheel 21 can be computed from the relation between the input shaft 23a and the output shaft 23b of the pinion shaft 23 and the spring coefficient of the torsion bar existing between them. This steering torque Ts is used for control of the assist motor 40 by the ECU 50.

Because as a result, the ECU 50 shown in FIG. 2 can generate an assist torque suitable for steering condition in the assist motor 40 based on the torque signal Ts of the torque sensor 30, the motor rotation angle θm of the motor resolver 42 and the 3-phase actual current values Iu, Iv, Iw of the current sensor 47 by PI control which will be described next, the steering mechanism 20 of the electric power steering apparatus enables assistance to the steering by a driver using the steering wheel 21.

Next, the computation processing of the PI control system to the assist motor 40 by the ECU 50 will be described with reference to FIG. 4. In the meantime, this computation processing is carried out at a predetermined cycle (for example, every 1 millisecond) by the CPU 60 of the ECU 50, for example, by timer interruption processing.

Figure 4:
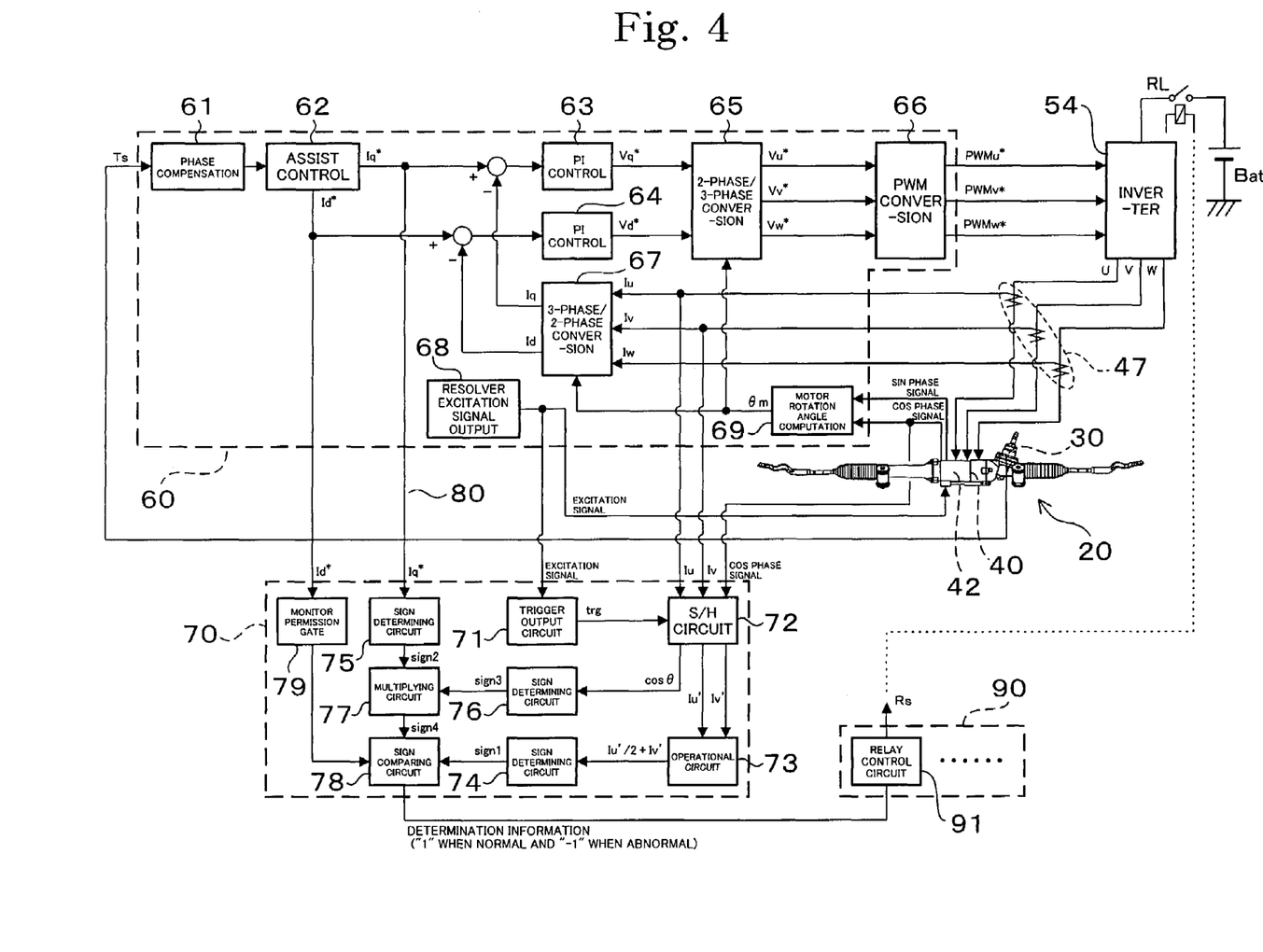
FIG. 4 is a functional block diagram of the PI control system of a motor and a monitor system of a motor control CPU according to this embodiment.
Figure 5:
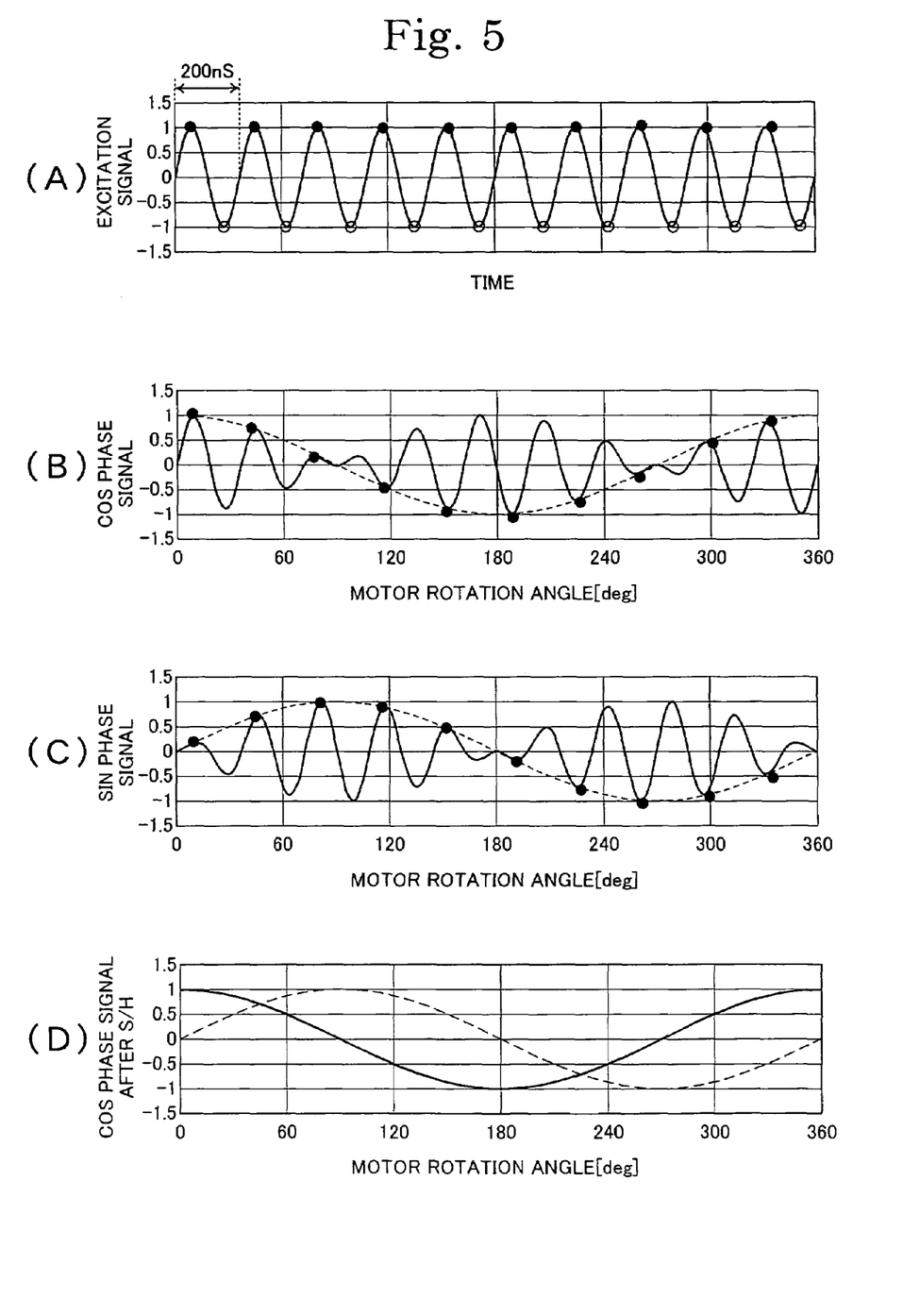

As shown in FIG. 4, a torque signal Ts inputted to the CPU 60 from the torque sensor 30 is inputted to a phase compensating portion 61 after its noise components are removed by a filter circuit (not shown). The phase compensating portion 61 outputs a phase compensated torque signal Ts to the assist control portion 62 after a processing for advancing the phase is carried out to accelerate the response of output from the torque sensor 30.

The assist control portion 62 executes processing of setting current value, that is, magnetic field current value (d-axis current instruction value Id*) to secondary magnetic flux generated in the assist motor and current value corresponding to assist torque, that is, torque instruction current value (q-axis current instruction value Iq*) in order to assist the steering force based on a detection torque by the torque signal Ts inputted from the phase compensating portion 61. For example, the d-axis current instruction value Id* is set by magnetic filed weakening control and the q-axis current instruction value Iq* is set by a predetermined or computation expression based on the detection torque. The d-axis current instruction value Id* and q-axis current instruction value Iq* are outputted to an adder located at a stage before the PI control portions 64, 63.

The adder located at a stage before the PI control portions 64, 63 executes addition processing of obtaining a difference between the current instruction values Id*, Iq* outputted from the assist control portion 62 and the d-axis, q-axis actual current values Id, Iq of the inverter 54 fed back from a 3-phase 2-phase converting portion 67 described later. As a consequence, a difference between the q-axis current instruction value Iq* and the q-axis actual current value Iq and a difference between the d-axis current instruction value Id* and d-axis actual current value Id are computed and outputted to the PI control portions 64, 63.

The PI control portions 63, 64 executes proportional-plus-integral control. That is, the PI control portions 63 executes proportional-plus-integral operation based on a difference between the q-axis current instruction value Iq* and q-axis actual current value Iq outputted form the adder on a preceding stage and executes processing of outputting q-axis voltage instruction value Vq* to the 2-phase/3-phase converting portion 65 as a correcting action for an integration value until a target value is reached. That is, the PI control portions 63 executes feed-back operation processing with the adder. Further, the PI control portions 64 executes proportional-plus-integration operation based on a difference between the d-axis current instruction value Id* and d-axis actual current value Id and executes processing of outputting the d-axis voltage instruction value Vd* to the 2-phase/3-phase converting portion 65 as a correcting action for the integration value until a target value is reached.

The 2-phase/3-phase converting portion 65 executes processing of executing dq inverse transformation (3-phase conversion) of each of the inputted q-axis voltage instruction value Vq* and d-axis voltage instruction value Vd* from the PI control portions 63, 64 so as to execute processing of computing the voltage instruction value Vu*, Vv*, Vw* of each phase. The voltage instruction value obtained by the inverse conversion by the 2-phase/3-phase converting portion 65 is outputted to a PWM converting portion 66 as U-phase voltage instruction value Vu*, V-phase voltage instruction value Vv* and W-phase voltage instruction value Vw*. The PWM converting portion 66 executes processing of converting the voltage instruction values Vu*, Vv*, Vw* of each phase to PWM instruction values PWMu*, PWMv* and PWMw*.

The inverter 54 turns ON/OFF a switching circuit (not shown) for each of the phase U, phase V, phase W based on the PWM signals PWMu*, PWMv*, PWMw* of each phase outputted from the PWM converting portion 66. As a result, because the inverter 54 converts DC power supplied from the DC power source Batt to 3-phase AC power and supplies a drive power to the assist motor 40, assist torque suitable for steering condition detected by the torque sensor 30 can be generated in the assist motor 40. Then, the output current outputted from the inverter 54 is detected by the current sensor 47 for each phase and outputted to the 3-phase 2-phase converting portion 67 as the U-phase actual current value Iu, the V-phase actual current phase Iv, and the W-phase actual current value Iw. Of these, the U-phase actual current value Iu and V-phase actual current value Iv are outputted to the monitor circuit 70 described later also.

The 3-phase 2-phase converting portion 67 executes processing of computing the d-axis actual current value Id and q-axis actual current value Iq by carrying out dq conversion (2-phase conversion) of the actual current values Iu, Iv, Iw of each phase inputted from the current sensor 47. In the meantime, the motor rotation angle θm is inputted to the 3-phase 2-phase converting portion 67 from the motor rotation angle computing portion 69. The output current value of the inverter 54 converted by the 3-phase 2-phase converting portion 67 is inputted to the adder as feedback located on preceding stage of the PI control portions 63, 64 as the d-axis, q-axis actual current values Id, Iq. As a consequence, the feedback operation processing by the PI control portions 63, 64 is enabled.

The motor rotation angle computing portion 69 executes processing of computing the motor rotation angle θm according to the aforementioned expressions (1), (2) based on 2-phase output signal (sin phase signal, cos phase signal) inputted from the motor resolver 42. As a consequence, computed motor rotation angle θm is outputted to 3-phase/2-phase converting portion 67. In the meantime, an excitation signal (see FIG. 2) outputted from the resolver excitation signal output portion 68 is inputted to the motor resolver 42.

The basic control of the electric power steering apparatus is enabled by executing the vector control of the assist motor 40 with the CPU 60. Here, the configuration and operation example of the monitor circuit 70 for monitoring whether or not the direction of the actual torque current (q-axis actual current value) to the torque instruction current value (q-axis current instruction value Iq*) by the CPU 60 is right will be described with reference to FIGS. 4-7.

As shown in FIG. 4, the monitor circuit 70 is constituted by connecting a trigger output circuit 71, S/H circuit 72, operational circuit 73, sign determining circuits 74, 75, 76, multiplying circuit 77, sign comparing circuit 78, monitor permission gate 79, wiring 80 and the like in a logic circuit (logic circuit) functionally independent of the CPU 60 and the outline of the function is as follows. According to this embodiment, the monitor circuit 70 is achieved by a gate circuit group of ASIC (application specific integrated circuit) constructed including the CPU 60 and the relay control portion 90.

That is, the monitor circuit 70 monitors whether or not the direction of the q-axis actual current value is right to the q-axis current instruction value Iq* computed by the CPU 60 and outputs determination information about whether or not an operation error occurs in the CPU 60, that is, about whether the CPU 60 is normal or abnormal. Then, if it is determined that an error exists in the operational processing of the CPU 60, determination information "−1" indicating an error of the CPU 60 is outputted to the relay control portion 90. As a consequence, the relay control circuit 91 of the relay control portion 90 stops output of the control signal Rs for maintaining the relay RL in ON state to interrupt the power supply from the direct current source Batt to the inverter 54, so that continuing of control of the steering mechanism 20 by the CPU 60 which gets into an operation error or the like can be prevented.

The trigger output circuit 71 corresponds to a "trigger means" described in CLAIMS and the S/H circuit 72 corresponds to a "hold means" described in CLAIMS. Further, the operational circuit 73, the sign determining circuits 74, 75, 76, the multiplying circuit 77 and the sign comparing circuit 78 correspond to "determining means" described in CLAIMS. The wiring 80 corresponds to "acquiring means" described in CLAIMS.

The trigger output circuit 71 is a logic circuit having a function of outputting a trigger signal trg based on an excitation signal of the motor resolver 42 and outputs the trigger signal trg at a predetermined timing by inputting an excitation signal outputted from the aforementioned resolver excitation signal output portion 68. This "predetermined timing", for example as shown in FIG. 5A, refers to a timing in which the excitation signal inputted from the resolver excitation signal output portion 68 turns to sin(ωt)=1 (● (black circle) indicated in the same Figure). As a consequence, the trigger signal can be outputted at a timing in which the amplitude of the excitation signal turns maximum (plus side). Thus, the timing in which the excitation signal turns to sin(ωt)=−1 (○ (white circle) indicated in the same Figure) so that the amplitude of the excitation signal turns maximum on the minus side is permitted. Because the trigger signal is outputted from the trigger output circuit 71 at such a timing in which the amplitude of the excitation signal turns maximum, the amplitude of the cos phase signal held by the S/H circuit 72 described next can be maximized.

The S/H circuit 72 is a logic circuit having a function of holding at least 2-phase current signal of the 3-phase current signals composed of phase U, V, W which drive the assist motor 40 and the cos phase signal outputted form the motor resolver 42 by sampling based on the trigger signal trg and after that, outputting to the operational circuit 73 and the sign determining circuit 76 as quantization data and includes sampling function, holding function and quantization function. Because according to this embodiment, the trigger signal trg inputted to the S/H circuit 72 by the trigger output circuit 71 takes a timing in which the excitation signal turns to sin(ωt)=1, the S/H circuit 72 samples the current signal of phase U, phase V and cos phase signal at this timing. In the meantime, a series of information processing for sampling and holding is called "sampling/holding".

As a consequence, for example, the cos phase signal is sampled at the timing of ● (black circle) as shown in FIG. 5(B). In the meantime, FIG. 5(C) shows an example in which the sin phase signal is sampled at the same timing for reference and FIG. 5(D) exemplifies cos phase signal waveform (solid line) and sin phase signal waveform (dotted line) after the sampling/holding. The current signals of phase U, phase V are sampled at the timing shown in FIG. 5(A) so that the current waveforms (phase U is indicated with thin solid line and phase V is indicated with thin dotted line) as shown in FIGS. 6(A), (B) are obtained. FIG. 6(A) indicates a case where the q-axis current instruction value Iq* is more than 0 (zero) and FIG. 6(B) shows a case where the q-axis current instruction value Iq* is less than 0 (zero).

The operational circuit 73 is a logic circuit having a function of executing a predetermined operation processing by inputting U-phase sample actual current value Iu' to U-phase actual current value Iu and V-phase sample actual current value Iv' to V-phase actual current value Iv of quantization data outputted from the S/H circuit 72. This embodiment enables operational processing of dividing the U-phase sample actual current value Iu' by 2 (Iu'/2) and then adding the V-phase sample actual current value Iv' to its result (Iu'/2+Iv'). This operation result is outputted to the sign determining circuit 74. In the meantime, the reason of this operation processing (Iu'/2+Iv') will be described later.

The sign determining circuit 74 is a logic circuit having a function of obtaining positive/negative polarity sign (sign1) obtained from an operational result by the operational circuit 73 and enables function operation processing (sign 1=sign (Iu'/2+Iv') for obtaining the positive/negative polarity sign from the operation result in the parentheses mentioned before. As a result, the polarity sign (sign1) obtained is outputted to the sign comparing circuit 78.

The sign determining circuit 75 is a logic circuit having a function of obtaining the positive/negative polarity sign (sign2) of the q-axis current instruction value Iq* by inputting the q-axis current instruction value Iq* outputted from the aforementioned assist control portion 62 through the wiring 80 and is constructed in substantially the same structure as the sign determining circuit 74. More specifically, this is constructed to be capable of function operation processing (sign2=sign (Iq*)). The obtained polarity sign (sign2) is outputted to the multiplying circuit 77.

The sign determining circuit 76 is a logic circuit having a function of obtaining the positive/negative polarity signal sign3 of the cos θ by inputting the cos θ to the cos phase signal and is constructed in substantially the same structure as the aforementioned sign determining circuit 74. More specifically, this is constructed to be capable of function operation processing (sign3=sign (cos θ)). The obtained polarity sign (sign3) is outputted to the multiplying circuit 77.

The multiplying circuit 77 is a logic circuit having a function of executing operation processing of multiplying the polarity sign (sign2) of the q-axis current instruction value Iq* inputted from the sign determining circuit 75 with the polarity sign (sign3) of the cos θ inputted from the sign determining circuit 76 (sign 2×sign3) and this operation result (sign4) is outputted to the sign comparing circuit 78. The operation processing (sign2×sign3=sign4) by this multiplying circuit 77 is carried out according to (+)×(+)=(+), (+)×(−)=(−), (−)×(+)=(−), (−)×(−)=(+). The reason of this operation processing (sign2×sign3) will be described later.

The sign comparing circuit 78 is a logic circuit having a function of comparing the polarity sign (sign1) inputted from the sign determining circuit 74 with the polarity sign sign4 inputted from the multiplying circuit 77 and outputs "1" indicating that the CPU 60 is normal when the both polarity signs meet and "−1" indicating that the CPU 60 is abnormal when the both polarity signs do not meet (inconsistent) as each determination information. Only when no output prohibition information is inputted from the monitor permission gate 79 for the reason described later (or the output permission information is inputted), the determination information is outputted.

That is, the sign comparing circuit 78 determines and monitors whether or not the assist control processing (assist control portion 62) by the CPU 60, particularly, the operational processing of the q-axis current instruction value Iq* is carried out normally or PWM converting processing (PWM converting portion 66) is carried out normally by comparing the polarity sign of the operation result (Iu'/2+Iv') processed by the operational circuit 73 with the polarity sign of the operation result (sign4=sign2×sign3=sign (Iq*×cos θ) processed by the multiplying circuit 77 so as to determine whether they are consistent or inconsistent. Here, the reason why it is determined whether the operation processing by the CPU 60 is carried out normally or not will be described by determining whether the both polarity signs are consistent or inconsistent.

When the assist motor 40 is a brushless DC motor and when the magnetic filed weakening control is not carried out in the relationship among the q-axis current instruction value Iq*, motor rotation angle θm, U-phase actual current value Iu and V-phase actual current value Iv, the d-axis current instruction value Id* can be set to 0 A (zero ampere). Thus, following expressions (3), (4) are established.

$$Iu = -\sqrt{(2/3)} \times Iq^* \times \sin\theta \qquad (3)$$

$$Iv = -\sqrt{(2/3)} \times Iq^* \times \sin(\theta - 120°) \qquad (4)$$

Because the right side of the expression (4) can be modified to a following expression (5), a following expression (6) can be introduced as a relation of the actual current values of phase U and phase V.

$$\text{Expression (4)} = -\frac{1}{2} \times \{-\sqrt{(2/3)} \times Iq^* \times \sin\theta\} + Iq^* \times \cos\theta/\sqrt{2} \qquad (5)$$

$$Iu/2 + Iv = Iq^* \times \cos\theta/\sqrt{2} \qquad (6)$$

In this expression (6), the cos θ is cos phase signal of the motor resolver 42 and if it is sampled and held at a timing in which the amplitude of the excitation signal sin(Wt) of the motor resolver 42 is maximum, just the sampling data becomes the same value as the cos θ. Thus, by sampling and holding the cos phase signal at the timing of sin(ωt)=1 and at the same time, sampling and holding the actual current values of phase U and phase V, the left-hand side (Iu/2+Iv) of the expression (6) can be computed so that the polarity signs (+), (−) of a computation result can be obtained (sign(Iu/2+Iv). This is the reason for the operation processing (Iu'/2+Iv') in the operational circuit 73 described above and the reason why the function operation processing (sign1=sign (Iu'/2+Iv')) is executed by the sign determining circuit 74.

On the other hand, by multiplying the polarity sign of the cos phase signal (=cos θ) sampled and held at the timing of sin(ωt)=1 with the polarity sign of the q-axis current instruction value Iq* acquired from the CPU 60, the right-hand side (Iq*×cos θ/√2) of the expression (6) can be computed so as to obtain the polarity signs (+), (−) of the operation result. To acquire the polarity sign, (sign(Iq*)×sign(cos θ)) can be computed. This is the reason why the result sign2 of the function operation processing (sign(Iq*)) by the sign determining circuit 75 described previously is multiplied with the result sign3 of the function operation processing (sign(cos θ)) by the sign determining circuit 76 (sign4=sign2×sign3) by means of the multiplying circuit 77.

Figure 6:
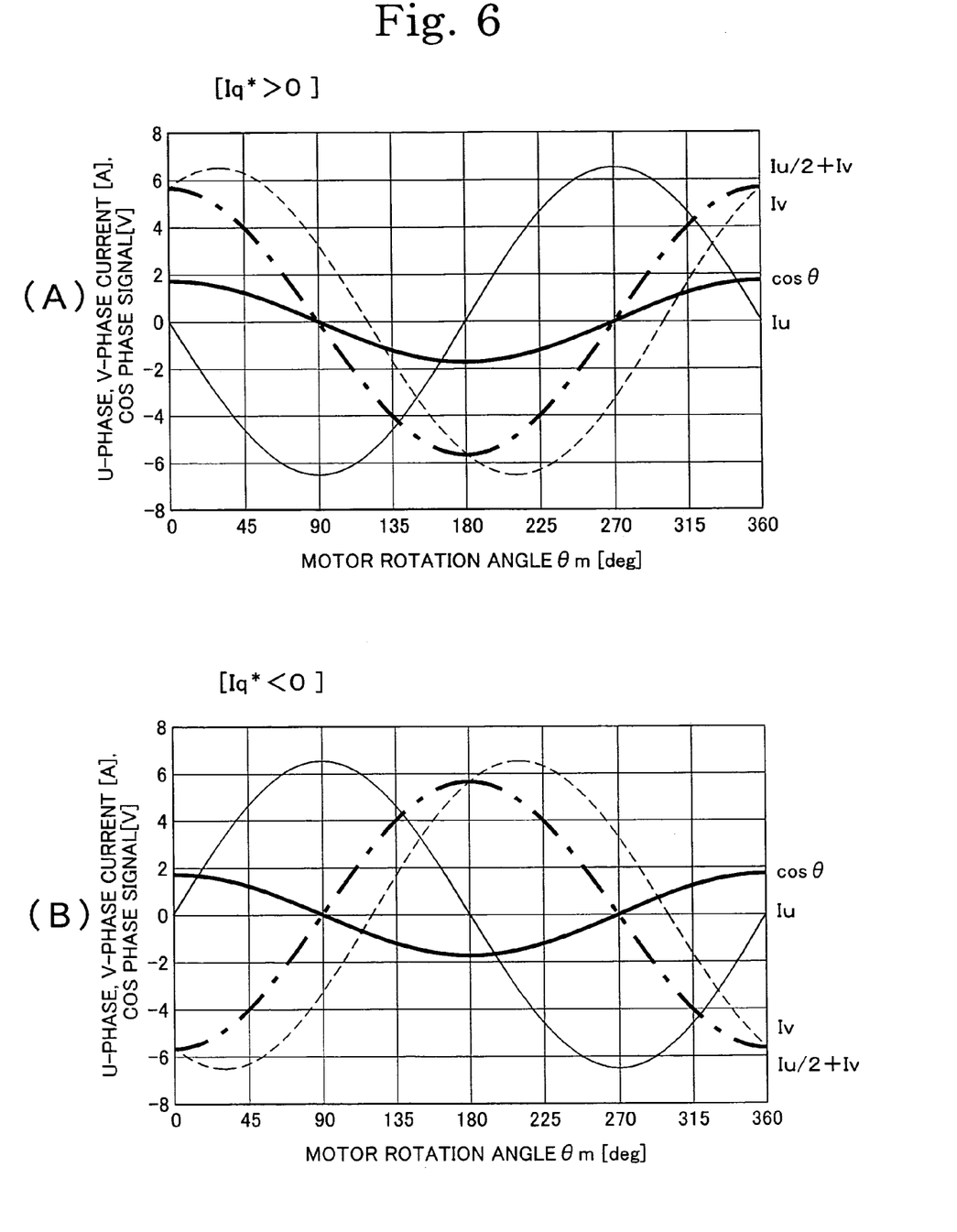
FIG. 6 show examples of waveforms when the U-phase, V-phase actual current values and cos phase signal of motor resolver are sampled at the timing of ● (black circle) indicated in FIG. 5(A)
Figure 7:
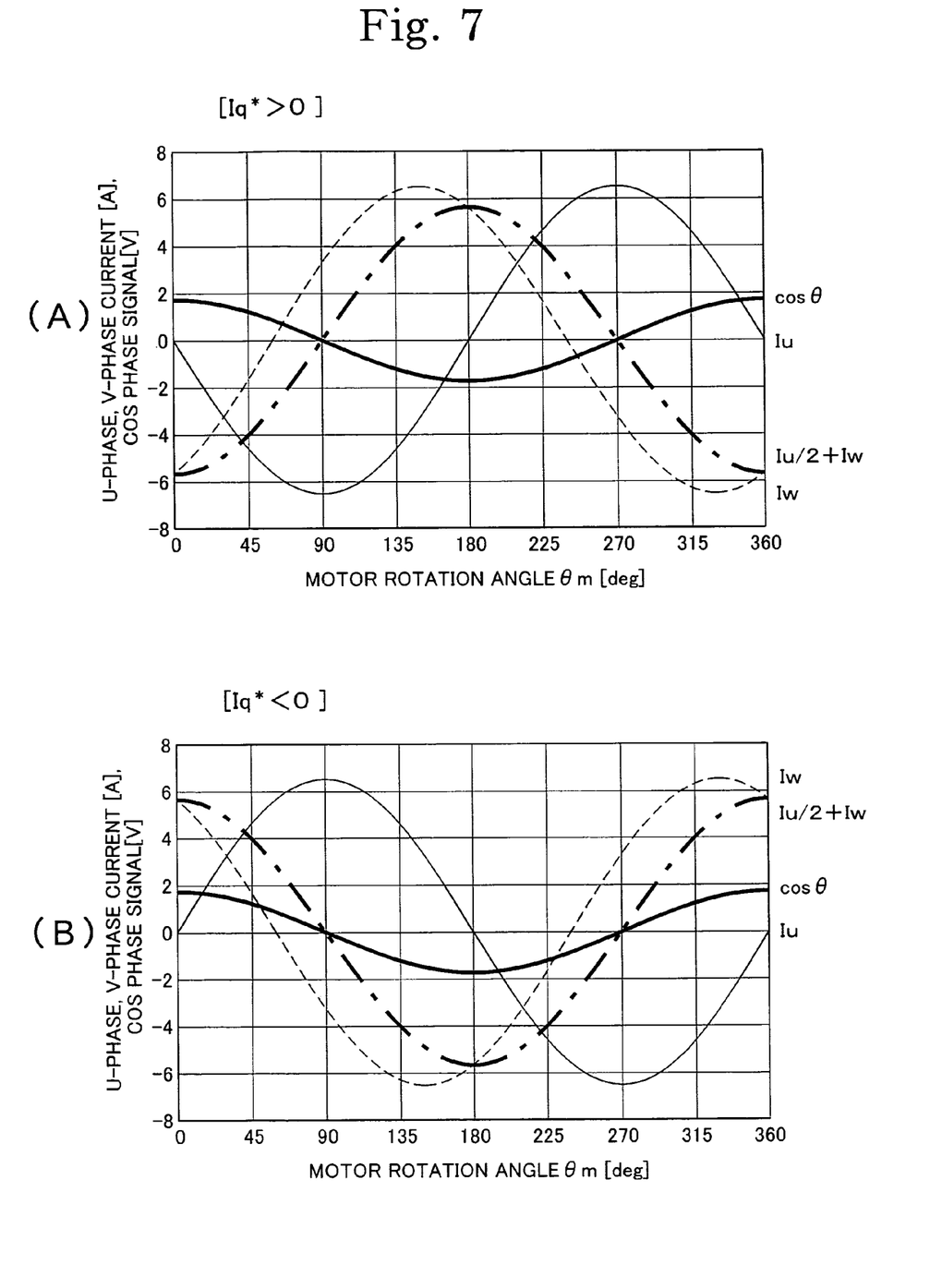
FIG. 7 show examples of waveforms when the U-phase, W-phase actual current values and cos phase signal of motor resolver are sampled at the timing of ● (black circle) indicated in FIG. 5(A)

The relation of the polarity signs of the right- and left-hand sides of the expression (6) can be understood visually from an example of the waveforms shown in FIG. 6(A) and FIG. 6(B). In the meantime, FIG. 6 shows an example of the waveform of each of the U-phase actual current value Iu (thin solid line), V-phase actual current value Iv (thin dotted line) and cos θ phase signal cos θ (thick solid line) sampled at the timing of ● (black circle) shown in FIG. 5(A) and an example of the waveform of an operation result (Iu/2+Iv) (thick dot and dash line) by the operational circuit 73. FIG. 6(A) shows a case where the q-axis current instruction value Iq* is larger than 0 (zero) and FIG. 6(B) shows a case where the q-axis current instruction value Iq* is smaller than 0 (zero).

That is, because when the q-axis current instruction value Iq* is larger than 0 (zero) (Iq*>0) as shown in FIG. 6(A), the polarity sign of Iq* on the right side of the expression (6) is positive (+), when the polarity sign of a waveform (thick dot and dash line) of (Iu/2+Iv) corresponding to the left side of the expression (6) is positive (+), the cos θ (thick solid line) on the right side of the same expression comes to have positive (+) polarity sign. Then, if attention is paid to the relation between the polarity sign of the waveform (thick dot and dash line) of the (Iu/2+Iv) shown in FIG. 6(A) and the polarity sign of the waveform of cos θ (thick solid line), it is evident that both the waveforms have positive (+) polarity sign in a range in which the motor rotation angle θm is "more than 0 degree to less than 90 degrees and over 270 degrees to below 360 degrees". On the other hand, when in case of Iq*>0, the polarity sign of the waveform (thick dot and dash line) of (Iu/2+Iv) corresponding to the left-hand side of the expression (6) is negative (−), the cos θ (thick solid line) on the right side of the same expression comes to have negative (−) polarity sign. In this case also, if attention is paid to the relation between the both waveforms and the polarity signs, it is evident that the both waveforms have negative (−) polarity sign in a range in which the motor rotation angle θm is over 90 degrees to less than 270 degrees.

Likewise, because when the q-axis current instruction value Iq* is smaller than 0 (zero) (Iq*<0) as shown in FIG. 6(B), the polarity sign of Iq* on the right side of the expression (6) is negative (−), when the polarity sign of a waveform (thick dot and dash line) of (Iu/2+Iv) corresponding to the left-hand side of the expression (6) is negative (−), the cos θ (thick solid line) on the right-hand side of the same expression comes to have positive (+) polarity sign. As a result, the cos θ (thick solid line) has positive (+) polarity sign in a range in which the motor rotation angle θm is more than 0 degrees to less than 90 degrees and over 270 degrees to below 360 degrees. On the other hand, when in case of Iq*<0, the polarity sign of the waveform (thick dot and dash line) of (Iu/2+Iv) corresponding to the left side of the expression (6) is positive (+), the cos θ (thick solid line) on the right side of the expression (6) comes to have negative (−) polarity sign. It is evident that the cos θ (thick solid line) has negative (−) polarity sign in a range in which the motor rotation angle θ m is "over 90 degrees to less than 270 degrees".

FIGS. 6(A) and 6(B) indicate that to determining whether or not the aforementioned expression (6) is established in order to monitor whether or not the direction of the actual torque current (actual current values Iu, Iv of phase U and phase V) is right to the torque instruction current value (q-axis current instruction value Iq*) in vector control of the assist motor 40 (DC brushless motor) can be performed by comparing the polarity sign of the left side of the same expression with the polarity sign of the right side. Thus, the aforementioned sign comparing circuit 78 is so constructed to compare sign1 which is the polarity sign of the left side of the expression (6) with sign4 which is the polarity sign of the right side and then output "1" indicating that the CPU 60 is normal as determination information when the both polarity signs are consistent (sign1=sign4) and "−1" indicating that the CPU 60 is abnormal when the both polarity signs are inconsistent (sign1≠sign4).

By constructing the electric power steering apparatus and its ECU 50 as described above, the monitor circuit 70 of the ECU 50 determines whether the CPU 60 is normal or abnormal based on consistency or inconsistency of the polarity signs introduced from the relation among the cos phase signal, q-axis current instruction value Iq*, U-phase actual current value Iu and V-phase actual current value Iv based on the aforementioned expression (6) in order to determine whether or not the direction of the q-axis actual current value is right to the q-axis current instruction value Iq* computed by the CPU 60 by means of the sign comparing circuit 78. It outputs "1" to the relay control portion 90 as determination information when the CPU is normal and "−1" when it is abnormal. If the determination information "1" indicating that the CPU 60 is normal is inputted, the relay control circuit 91 of the relay control portion 90 outputs a control signal Rs for maintaining the relay RL in ON state to the relay RL so as to enable supply of electricity from the DC power source Batt to the inverter 54. If the determination information "−1" indicating that the CPU 60 is abnormal is inputted, it stops output of the control signal Rs for maintaining the relay RL in ON state to disable supply of electricity from the DC power source Batt to the inverter 54. Thus, if the CPU 60 is abnormal, the drive control of the assist motor 40 by the CPU 60 can be stopped. Thus, the assist control of the driven wheels when the output of the assist motor 40 is inappropriate due to operation error in the CPU 60 can be prevented, thereby preventing generation of a drive force acting in an inappropriate direction.

Although according to this embodiment, the relay control portion 90 described above is constituted, for example when the determination information "−1" indicating that the CPU 60 is abnormal is outputted from the monitor circuit 70, it is permissible to construct a logic circuit for restarting the basic control program (BIOS and the like) of the CPU 60 by resetting (restarting) the CPU 60 in terms of hardware compulsorily. As a consequence, if the error of the CPU 60 is due to abnormal processing (division by zero, memory access violation, program runaway and the like in terms of software), the abnormality can be eliminated by the restart.

By the way, the relations in the expressions (3)-(6) are presumed in that the d-axis current instruction value Id* is 0 A (zero ampere). If the d-axis current instruction value Id* outputted form the assist control portion 62 is 0 A (zero ampere) or substantially not 0 A because of the magnetic filed weakening control or the like, shift in phase occurs between the cos θ of the cos phase signal and the actual current values Iu, Iv of phase U and phase V. Thus, as shown in FIGS. 6(A), 6(B), it becomes hard for the motor rotation angle θm in which the waveform (thick dot and dash line) of (Iu/2+Iv) corresponding to the left-hand side of the expression (6) crosses zero and the motor rotation angle θm in which the waveform of cos θ (thick solid line) on the right side of the expression (6) crosses zero to meet each other thereby making it difficult to determine whether the polarity signs are consistent or inconsistent based on the expression (6).

Thus, according to this embodiment, the monitor permission gate 79 is provided to detect the d-axis current instruction value Id* inputted from the assist control portion 62 in order to monitor that no d-axis current instruction value Id* is outputted, that is, the d-axis current instruction value Id* is 0 A (zero ampere) or substantially 0 A and if d-axis current instruction value is not Id*=0 A or Id*≈0 A, output prohibition information (or if the d-axis current instruction value Id*=0 A or Id*≈0 A, output permission information which permits output of determination information by the sign comparing circuit 78) can be outputted to the sign comparing circuit 78.

Because if no d-axis current instruction value Id* is outputted from the assist control portion 62, monitoring whether or not the d-axis current instruction value Id* is outputted is not required, the monitor permission gate 79 does not need to be provided. If the d-axis current instruction value Id* is not Id*=0 A or Id*≈0 A and no monitor permission gate 79 is provided while a range which makes it difficult to determine whether the polarity signs are consistent or inconsistent due to the shift in phase described previously is known, the sign comparing circuit 78 may be constituted of a logic circuit so that a predetermined angle range (±5 degrees) is set as a determination prohibition range around the motor rotation angle θm (0) in which the waveform of cos θ (thick solid line) crosses zero and when it is within that range, the output of the determination information by the sign comparing circuit 78 is canceled while when it is out of that range, the determination information is outputted by the sign comparing circuit 78. As a result, even if the magnetic filed weakening control or the like is carried out, the monitor circuit 70 can be constituted without provision of the monitor permission gate 79.

Although the configuration example of the monitor circuit 70 described with reference to FIG. 6 samples and holds the U-phase actual current value Iu and V-phase actual current value Iv of the 3-phase actual current values Iu, Iv, Iw with the S/H circuit 72, it is permissible to sample and hold the U-phase actual current value Iu and W-phase actual current value Iw with the S/H circuit 72 to determine whether the polarity signs are consistent or inconsistent with the operational circuit 73, sign determining circuits 74, 75, 76, multiplying circuit 77, sign comparing circuit 78, and monitor permission gate 79 in the same way as described previously. In this case, whether the polarity signs are consistent or inconsistent is determined using a following expression (7) instead of the aforementioned expression (6).

$$Iu/2+Iw=-Iq^* \times \cos\theta/\sqrt{2} \qquad (7)$$

As a result, when the q-axis current instruction value Iq* is larger than 0 (zero) (Iq*>0) as shown in FIG. 7(A), the polarity sign of Iq* on the right-hand side of the expression (7) is positive (+). Thus, when the polarity sign of the waveform (thick dot and dash line) of (Iu/2+Iw) corresponding to the left side of the expression (7) is negative (−), the cos θ (thick solid line) on the right side of the same expression comes to have positive (+) polarity sign and the cos θ (thick solid line) has positive (+) polarity sign in a range "in which the motor rotation angle θm is over 0 degrees to less than 90 degrees and over 270 degrees to below 360 degrees". On the other hand, when in case of Iq*>0, the polarity sign of the waveform (thick dot and dash line) of (Iu/2+Iw) corresponding to the left-hand side of the expression (7) is positive (+), the cos θ (thick solid line) of the right side of the same expression comes to have negative (−) polarity sign and the cos θ (thick solid line) has negative (−) polarity sign in a range "in which the motor rotation angle θm is over 90 degrees to less than 270 degrees".

Likewise, because when the q-axis current instruction value Iq* is smaller than 0 (zero) (Iq*<0) as shown in FIG. 7(B), the polarity sign of Iq* on the right-hand side of the expression (7) is negative (−), when the polarity sign of a waveform (thick dot and dash line) of (Iu/2+Iw) corresponding to the left-hand side of the expression (7) is positive (+), the cos θ (thick solid line) on the right-hand side of the same expression comes to have positive (+) polarity sign. As a result, both the waveforms have positive (+) polarity sign in a range in which the motor rotation angle θm is more than 0 degrees to less than 90 degrees and over 270 degrees to below 360 degrees. On the other hand, when in case of Iq*<0, the polarity sign of the waveform (thick dot and dash line) of (Iu/2+Iw) corresponding to the left-hand side of the expression (7) is negative (−), the cos θ (thick solid line) on the right side of the same expression comes to have negative (−) polarity sign. It is evident that both the waveforms have negative (−) polarity sign in a range in which the motor rotation angle θm is "over 90 degrees to less than 270 degrees". Thus, the structure of sampling and holding the U-phase actual current value Iu and the W-phase actual current value Iw can secure the same operation and effect as the above-mentioned monitor circuit 70.

As described above, the monitor circuit 70 of the electric power steering apparatus of this embodiment is constituted by connecting the trigger output circuit 71, S/H circuit 72, operational circuit 73, sign determining circuits 74, 75, 76, multiplying circuit 77, sign comparing circuit 78, monitor permission gate 79, and the like in a logic circuit (logic circuit) functionally independent of the CPU 60 for controlling the assist motor 40. That is, a trigger signal trg is outputted based on an excitation signal of the motor resolver 42 from the trigger output circuit 71 and at least 2-phase current signal of the 3-phase actual current values Iu, Iv, Iw composed of phase U, phase V, phase W for driving the assist motor 40 with the S/H circuit 72, for example, the U-phase actual current value Iu, V-phase actual current value Iv and cos phase signal outputted from the motor resolver 42 are sampled and held based on this trigger signal trg. Then, the d-axis current instruction value Iq* of the d-axis, q-axis current instruction values Id*, Iq* is acquired through the wiring 80 and the operational circuit 73, the sign determining circuits 74, 75, 76, the multiplying circuit 77 and the sign comparing circuit 78 determine whether the CPU 60 is normal based on consistency or inconsistency of the polarity signs introduced from the relation among the cos phase signal, q-axis current instruction value Iq*, U-phase current instruction value Iq*, U-phase actual current value Iu and V-phase actual current value Iv based on the aforementioned expression (6) if the 2-phase current signal is the U-phase, V-phase actual current values Iu, Iv and "1" is outputted as the determination information if the CPU 60 is normal and "−1" is outputted if it is abnormal.

As a result, the trigger circuit 71, the S/H circuit 72, the operational circuit 73, the sign determining circuits 74, 75, 76, the multiplying circuit 77, the sign comparing circuit 78, the monitor permission gate 79 and the like are constituted with a logic circuit functionally independent of the CPU 60 for controlling the assist motor 40 without providing other outside CPU than the CPU 60 and whether or not the CPU 60 is normal can be determined depending on the determination information outputted form the sign comparing circuit 78. Thus, whether the CPU 60 is normal or abnormal can be determined with an inexpensive structure as compared with a case of determining whether the CPU 60 is normal by providing another outside CPU. Further, as a consequence, whether the output of the assist motor is appropriate can be determined with an inexpensive structure.

In the monitor circuit 70 of the ECU 50 of the electric power steering apparatus of this embodiment, the determination information by the sign comparing circuit 78 is outputted when the d-axis current instruction value Id* of the d-axis, q-axis current instruction values Id*, Iq* is substantially 0 (zero) or 0 (zero). Thus, even if the "magnetic filed weakening control" for lowering induced electromotive force is carried out by feeding current for killing out magnetic force of a permanent magnet of a rotator to the coil of a stator of the assist motor 40, whether the CPU 60 is normal or abnormal can be determined depending on the determination information outputted from the sign comparing circuit 78 without receiving an influence of this d-axis current instruction value Id* (for example, generation of shift in phase between signal waveforms which are a determining object of the polarity sign and the like). Thus, whether the CPU is normal or abnormal can be determined accurately with an inexpensive structure even if such "magnetic filed weakening control" is carried out. As a result, whether the output of assist motor 40 is normal or abnormal can be determined securely with an inexpensive structure.

Further, the monitor circuit 70 of the ECU 50 of the electric power steering apparatus of this embodiment can output a trigger signal at a timing in which the amplitude of the excitation signal maximizes because the trigger circuit 71 outputs the trigger signal when the excitation signal is $\sin(\omega t)=1$ or $\sin(\omega t)=-1$ (see FIG. 5(A)). Thus, the amplitude of the cos phase signal sampled and held by the S/H circuit 72 can be maximized so that determining of whether the polarity signs are consistent or inconsistent by the operational circuit 73, the sign determining circuits 74, 75, 76, the multiplying circuit 77 and the sign comparing circuit 78 can be carried out more securely. As a result, whether the CPU is normal or abnormal can be determined securely with an inexpensive structure. As a consequence, whether the output of the assist motor 40 is appropriate can be determined securely with an inexpensive structure.

Further, the monitor circuit 70 of the ECU 50 of the electric power steering apparatus of this embodiment can determine whether the CPU 60 is normal or abnormal with an inexpensive structure even if there is any limit which prevents the W-phase actual current value Iw from being used form viewpoints of its hardware, because the 2-phase current signal is "U-phase actual current value Iu and V-phase actual current value Iv" of the 3-phase actual current values Iu, Iv, Iw. Additionally, placing around harness and the like can be simplified correspondingly to that the W-phase actual current value Iw is not needed. Even if the "U-phase actual current value Iu and W-phase actual current value Iw" or "V-phase actual current value Iv and W-phase actual current value Iw" of the 3-phase actual current values Iu, Iv, Iw is selected, limitation on the hardware structure can be met in the same way as when the "U-phase actual current value Iu and the V-phase actual current Iv" is selected, thereby simplifying the placing around of the harness and the like. If the "V-phase actual current value Iv and W-phase actual current value Iw" is selected, whether the polarity signs are consistent or inconsistent is determined using a following expression (8) instead of the above-mentioned expression (6).

$$Iv/2+Iw=Iq^* \times \cos(\theta-120°)/\sqrt{2} \qquad (8)$$

Although according to this embodiment, the monitor circuit 70 is constituted within the ASIC constructed including the CPU 60, the present invention is not restricted to this but any other structure may be adopted as long as it is constructed of a logic circuit functionally independent of the CPU 60. For example, the monitor circuit 70 may be constructed of a gate array or programmable logic device (PLD) provided within the ECU 50 physically separately form the CPU 60.

Although in this embodiment, an application example of the motor control apparatus has been described by exemplifying the vehicle electric power steering apparatus as an embodiment of the vehicle steering apparatus, the present invention is not restricted to this, but the motor control apparatus of the present invention can be applied to steer-by-wire system (SBW), which is conceived as "vehicle steering apparatus having a steering control system which determines the target steering angle of driven wheels based on the operating condition of a steering wheel to control the driven wheels to this determined target steering angle and which determines the target steering angle of the steered wheels based on the operating condition of the steering wheel without providing a link mechanism for connecting mechanically the steering wheel to the steering mechanism of the driven wheels to control the driven wheels to this determined target steering angle or VGRS (variable gear ratio system®;) conceived as "vehicle steering apparatus having a transmission ratio changing means for changing the transmission ratio by driving the electric motor in the middle of steering transmission system which connects the steering wheel to the driven wheels". If the motor control apparatus of the present invention is applied to such SBW or VGRS® also, the same operation and effect as when the monitor circuit 70 is applied to the ECU 50 of the vehicle electric power steering apparatus described above can be obtained.

What is claimed is:

1. A motor control apparatus for vector-controlling a DC brushless motor with a motor control CPU based on a motor rotation angle detected by 1-phase excitation 2-phase output type resolver, comprising:

a trigger means for outputting a trigger signal based on an excitation signal of the resolver;

a holding means for holding at least 2-phase current signals of 3-phase current signals composed of phase U, phase V, phase W for driving the DC brushless motor and cos phase signal outputted from the resolver based on the trigger signal;

an acquiring means for acquiring q-axis current instruction value of d-axis, q-axis current instruction values to be converted to the 3-phase current signals; and a determining means that determines whether the motor control CPU is normal or abnormal based on consistency or inconsistency of the polarity signs introduced from the relation based on a predetermined expression among the cos phase signal, the q-axis current instruction value and the 2-phase current signals and outputs its determination result as determination information, wherein the trigger means, the holding means, the acquiring means and the determining means are constituted of a logic circuit functionally independent of the motor control CPU.

2. The motor control apparatus according to claim 1 wherein the determination information is outputted when the d-axis current instruction value of the d-axis, q-axis current instruction values is substantially zero or zero.

3. The motor control apparatus according to claim 1 or 2 wherein the trigger means outputs the trigger signal when the excitation signal is $\sin(\omega t)=1$ or $\sin(\omega t)=-1$.

4. The motor control apparatus according to claim 1 or 2 wherein the 2-phase current signals is "U-phase current signal and V-phase current signal" or "U-phase current signal and W-phase current signal" of the 3-phase current signals.

5. A vehicle steering apparatus that controls the drive of an assist motor based on the steering condition of a steering wheel and controls the steering angle of steered wheels by the drive force of the assist motor or by compensating the drive force, the assist motor being controlled by the motor control CPU of the motor control apparatus described in claim 1 or 2, the motor control CPU being taken as a determining object by the determining means, wherein if determination information indicating that the motor control CPU is abnormal is outputted by the determining means, the drive control of the assist motor by the motor control CPU is canceled.

* * * * *